United States Patent
Grosjean et al.

(10) Patent No.: US 8,051,711 B2
(45) Date of Patent: Nov. 8, 2011

(54) ELECTRONIC CIRCUIT FOR MEASURING A PHYSICAL PARAMETER SUPPLYING AN ANALOGUE MEASUREMENT SIGNAL DEPENDENT UPON THE SUPPLY VOLTAGE

(75) Inventors: Sylvain Grosjean, Les Fins (FR); Michel Willemin, Preles (CH); Beat Pfefferli, Thielle-Wavre (CH)

(73) Assignee: EM Microelectronic-Marin S.A., Marin (CH)

( * ) Notice: Subject to any disclaimer, the term of this patent is extended or adjusted under 35 U.S.C. 154(b) by 529 days.

(21) Appl. No.: 12/207,689

(22) Filed: Sep. 10, 2008

(65) Prior Publication Data
US 2009/0066392 A1    Mar. 12, 2009

(30) Foreign Application Priority Data
Sep. 11, 2007 (CH) .................... 1431/07

(51) Int. Cl.
  G01P 15/00  (2006.01)
(52) U.S. Cl. ........................................... 73/489
(58) Field of Classification Search ............. 73/489, 73/491, 498; 702/57, 104, 138; 327/100, 327/306
See application file for complete search history.

(56) References Cited

U.S. PATENT DOCUMENTS

| | | | |
|---|---|---|---|
| 5,563,922 A | | 10/1996 | Beltz et al. |
| 5,973,313 A | * | 10/1999 | Redford et al. ............ 250/210 |
| 6,085,576 A | * | 7/2000 | Sunshine et al. ............ 73/29.01 |
| 6,789,030 B1 | | 9/2004 | Coyle |
| 6,919,731 B2 | * | 7/2005 | Slates ............ 324/716 |
| 7,496,458 B2 | * | 2/2009 | Walter et al. ............ 702/57 |
| 2003/0206001 A1 | | 11/2003 | Slates |
| 2005/0283330 A1 | | 12/2005 | Laraia et al. |
| 2006/0022648 A1 | * | 2/2006 | Ben-Yaakov et al. ......... 323/222 |
| 2008/0068008 A1 | | 3/2008 | Watson et al. |

FOREIGN PATENT DOCUMENTS

| | | |
|---|---|---|
| AU | 719150 B2 | 5/1997 |
| EP | 0 702 207 A1 | 3/1996 |
| EP | 1 548 409 A1 | 6/2005 |
| WO | 99/47905 | 9/1999 |
| WO | 2005/018444 A1 | 3/2005 |
| WO | 2005/029098 A2 | 3/2005 |
| WO | 2006/007105 A2 | 1/2006 |

OTHER PUBLICATIONS

Swiss search report issued in corresponding application No. Ch 1431/07, dated Oct. 17, 2007.

* cited by examiner

Primary Examiner — Helen C. Kwok
(74) Attorney, Agent, or Firm — Griffin & Szipl, P.C.

(57) ABSTRACT

The electronic circuit for measuring at least one physical parameter supplies an analogue output measurement signal ($S_A$) dependent upon the value of a supply voltage. The circuit includes a sensor interface, connected to a sensor for supplying an analogue measurement signal ($V_m$) which is then filtered, an analogue-digital converter for digitally converting the filtered signal ($S_m$), and a digital signal control and processing unit for receiving a converted signal from the converter and supplying a digital measurement signal ($S_D$). The sensor interface, the analogue-digital converter, and the processing unit are powered by a voltage regulator. The analogue and digital measurement signals are thus independent of any variation in the supply voltage ($V_{CC}$) of the electronic circuit. A ratiometric unit, which may be an analogue multiplier or an analogue-digital converter, is powered by the supply voltage source (Bat) to recreate ratiometry on $S_A$ on the basis of $S_m$ or $S_D$.

8 Claims, 4 Drawing Sheets

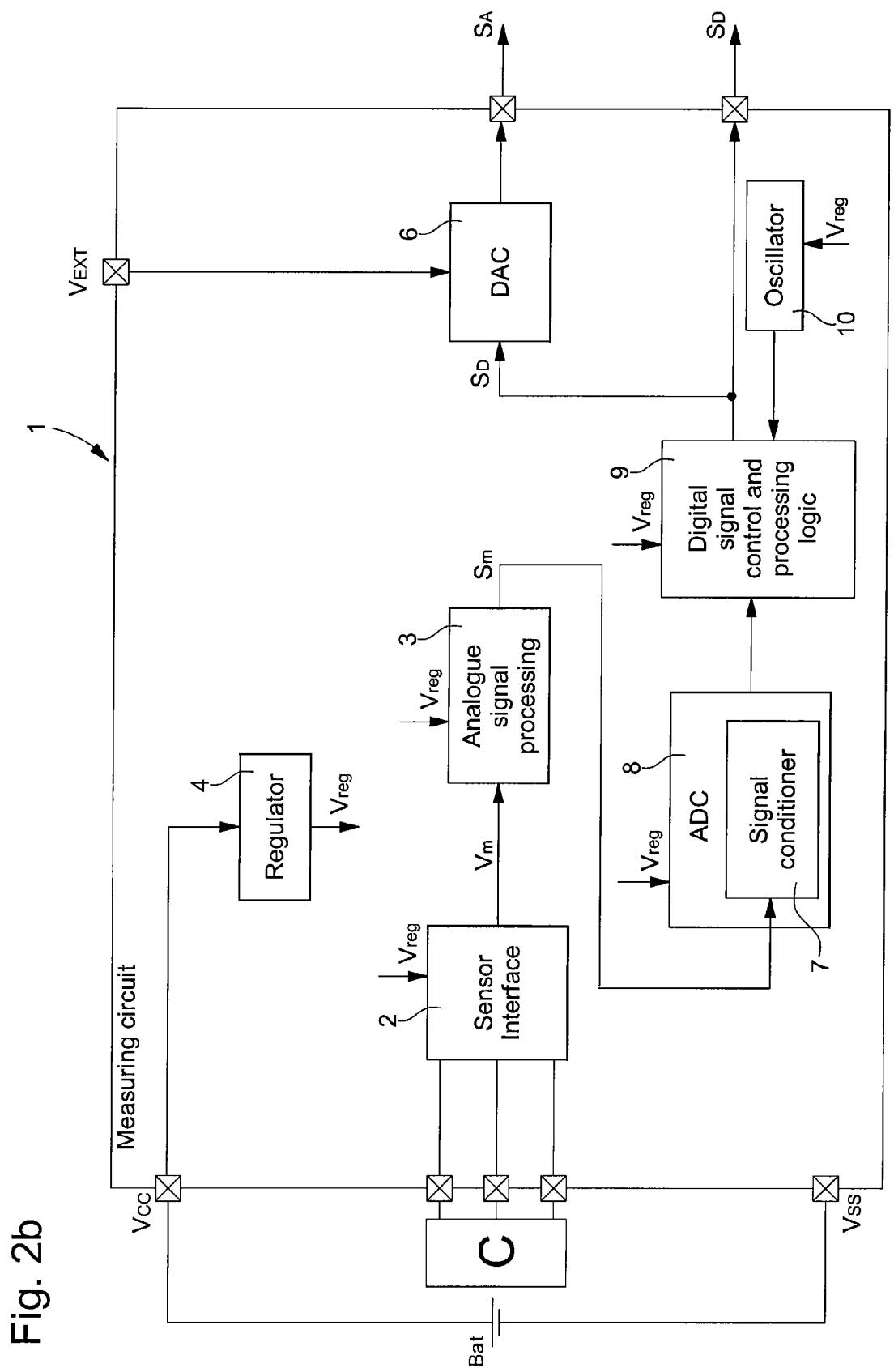

ELECTRONIC CIRCUIT FOR MEASURING A PHYSICAL PARAMETER SUPPLYING AN ANALOGUE MEASUREMENT SIGNAL DEPENDENT UPON THE SUPPLY VOLTAGE

This application claims priority from Swiss Patent Application No. 01431/07 filed Sep. 11, 2007, the entire disclosure of which is incorporated herein by reference.

FIELD OF THE INVENTION

The invention concerns an electronic circuit for measuring at least a physical parameter able to supply an analogue measurement output signal dependent upon the value of a supply voltage. In order to do this, the electronic circuit includes a sensor interface connected to an external sensor for measuring the physical parameter, an analogue-digital converter for digitally converting a signal that is a function of an analogue measurement signal produced by the sensor interface. The electronic circuit further includes a digital signal control and processing unit connected to the converter for supplying a digital measurement signal representative of the value of the physical parameter measured by the sensor. A voltage regulator, which is powered by an external continuous supply voltage, powers the sensor interface, the converter and the control and processing unit at a regulated voltage. Thus, the analogue measurement signal from the interface and the digital measurement signal are independent of any variation in the level of the electronic circuit supply voltage.

BACKGROUND OF THE INVENTION

When the measured value of the physical parameter defined in an analogue or digital measurement signal is dependent especially linearly upon the value of the supply voltage level of an electronic measuring circuit, this is called ratiometry. In this regard, one may cite EP Patent No 0 702 207, which discloses a ratiometric transducer for which the analogue measurement signal supplied at output is directly dependent upon the variation in the supply voltage of said transducer. However, in this type of transducer, all of the components are directly powered by a supply voltage source, which may lead to high electrical energy consumption, a drawback particularly when the voltage source is a battery. Moreover, if the transducer components are integrated in an integrated circuit, the size of the electronic elements of each component cannot be greatly reduced.

SUMMARY OF THE INVENTION

It is thus an object of the invention to provide an electronic measuring circuit that can easily recreate ratiometry on the analogue output signal for measuring a physical parameter while maintaining most of the components of the circuit at a regulated voltage. This regulated voltage is preferably a low voltage.

The invention therefore concerns an electronic measuring circuit for measuring at least one physical parameter, such as an acceleration, angular velocity, force or pressure, characterized in that the electronic circuit includes—a sensor interface connected at input to an external sensor for measuring a physical parameter, and supplying at output at least one analogue measurement signal representative of the value of the physical parameter measured by the sensor,—an analogue-digital converter for digitally converting a signal as a function of the analogue measurement signal produced by the sensor interface,—a digital signal control and processing unit for receiving a signal converted by the converter, and supplying at output a digital measurement signal representative of the value of the physical parameter measured by the sensor, and—a voltage regulator able to be powered via a first external continuous supply voltage source, the regulator supplying a regulated voltage to the sensor interface, the converter and the control and processing unit so that the analogue measurement signal from the interface and the digital measurement signal are independent of any variation in the level of the supply voltage of the electronic circuit, wherein the electronic circuit includes a ratiometric unit able to be powered via the first external supply voltage source or by a second external supply voltage source, to supply an analogue output measurement signal representative of the value of the measured physical parameter, on the basis of the analogue measurement signal or the digital measurement signal, and dependent upon the variation in the level of the supply voltage from the first or second external voltage source. Additional, particular beneficial, embodiments of the invention are provided in accordance with the following subsidiary electronic measuring circuits.

In accordance with a second electronic measuring circuit embodiment of the invention, the first embodiment is modified so that the ratiometric unit includes an analogue multiplier for multiplying a signal that is a function of the analogue measurement signal produced by the sensor interface by the value of the supply voltage originating from the first or second external voltage source pondered by a predetermined constant factor, in order to supply an analogue output measurement signal dependent upon the variation in the level of the analogue multiplier supply voltage. In a third electronic measuring circuit embodiment of the invention, the first embodiment is modified so that the ratiometric unit includes a digital-analogue converter able to be powered via the first external supply voltage source or the second external supply voltage source, and receiving the digital measurement signal from the digital signal control and processing unit to produce the analogue output measurement signal dependent upon the variation in the level of the digital-analogue converter supply voltage. In a fourth electronic measuring circuit embodiment of the invention, the first embodiment is modified so that it includes an analogue signal processing unit arranged between the sensor interface and the analogue-digital converter so as to shape at least the analogue measurement signal produced by the sensor interface. In a fifth electronic measuring circuit embodiment of the invention, the fourth embodiment is modified so that the analogue signal processing unit includes at least one low pass filter for supplying a filtered analogue measurement signal. In a sixth electronic measuring circuit embodiment of the invention, the fifth embodiment is modified so that the analogue signal processing unit includes a first low pass filter directly connected to the sensor interface to filter at least one analogue measurement signal produced by the sensor interface, and a second programmable second-order low-pass filter connected to the output of the first low pass filter to produce at least one filtered analogue measurement signal. In a seventh electronic measuring circuit embodiment of the invention, the fifth embodiment is modified so that the filtered analogue measurement signal is supplied directly to an analogue multiplier of the ratiometric unit for supplying an analogue output measurement signal dependent upon the level of the multiplier supply voltage. In a eighth electronic measuring circuit embodiment of the invention, the first embodiment is modified so that it includes an oscillator connected to the digital signal control and processing unit for clocking the operations processed by the digital signal control and processing unit, said unit supplying configuration data and also controlling the operations of the electronic circuit components on the basis of a clock signal supplied by the oscillator.

One advantage of the electronic measuring circuit according to the invention lies, generally, in the fact that it can recreate ratiometry on an analogue output measurement signal so that the signal is dependent upon the value of the supply voltage level of the electronic circuit or the ratiometric unit. This analogue output signal is obtained on the basis of a signal that is independent of any variation in the supply voltage and produced by a component powered by the regulated voltage. This analogue output signal is obtained on the basis of the analogue measurement signal produced by the sensor interface or on the basis of the digital measurement signal produced by the digital signal control and processing unit.

Thus, most of the components of the electronic circuit can operate at a regulated voltage, which is preferably a low voltage. Only the voltage regulator and the ratiometric unit are powered directly or via a resistive bridge by the same or a different external supply voltage source.

Advantageously the electronic circuit can be an integrated circuit made in a low power CMOS technology lower than μm, for example 0.5 μm, 0.18 μm or lower. So a great deal of electronic circuit components can be made with a small size, that allows reducing electric consumption of the electronic circuit in an operating mode. This allows also to have into the integrated electronic circuit all of the signal processing in particular by the digital signal control and processing unit, by recreating easily the ratiometry of the analogue output signal.

An analogue multiplier can advantageously supply the analogue output measurement signal. The multiplier may be powered directly or via a resistive bridge at a supply voltage supplied by the same or a different supply voltage source of the electronic circuit. The multiplier receives at input the analogue measurement signal, which may be filtered, from the sensor interface. The analogue multiplier may include a variable gain amplifier, which supplies the analogue output signal.

An analogue-digital converter can advantageously supply the analogue output measurement signal. The converter may be powered directly or via a resistive bridge at a supply voltage supplied by the same or a different supply voltage source of the electronic circuit. The converter is controlled by the digital measurement signal produced by the digital signal control and processing unit.

BRIEF DESCRIPTION OF THE DRAWINGS

The objects, advantages and features of the electronic circuit for measuring a physical parameter will appear more clearly in the following description of non-limiting embodiments illustrated by the drawings, in which:

FIGS. 2a and 2b show, in a simplified manner, two variants of a second embodiment of an electronic circuit for measuring a physical parameter according to the invention.

DETAILED DESCRIPTION OF THE PREFERRED EMBODIMENTS

In the following description, all of the components of the electronic physical parameter measurement circuit, which are well known to those skilled in this technical field, are described in only a simplified manner.

Figure 1A:
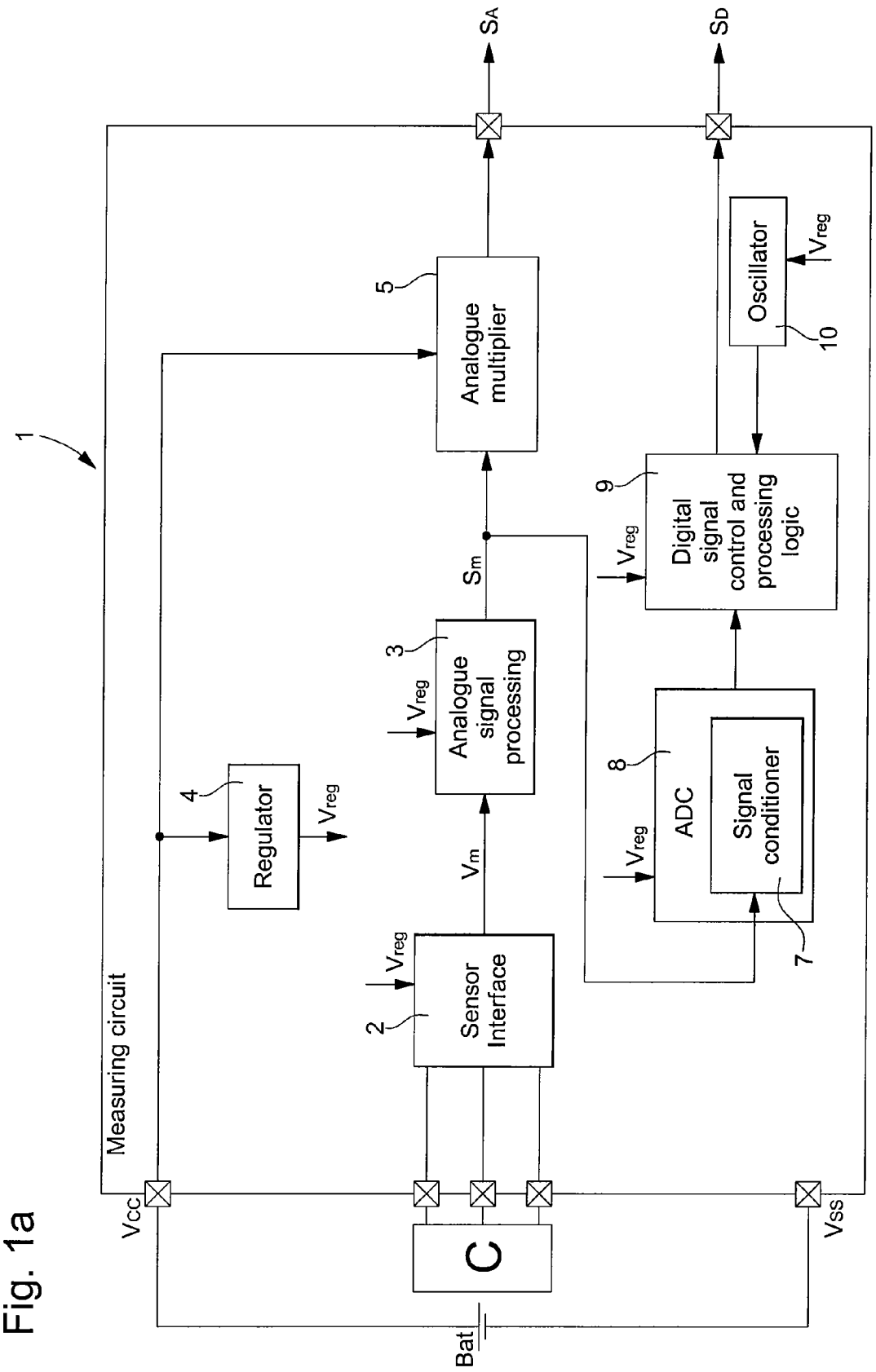
FIGS. 1a and 1b show, in a simplified manner, two variants of a first embodiment of an electronic circuit for measuring a physical parameter according to the invention.
Figure 1B:
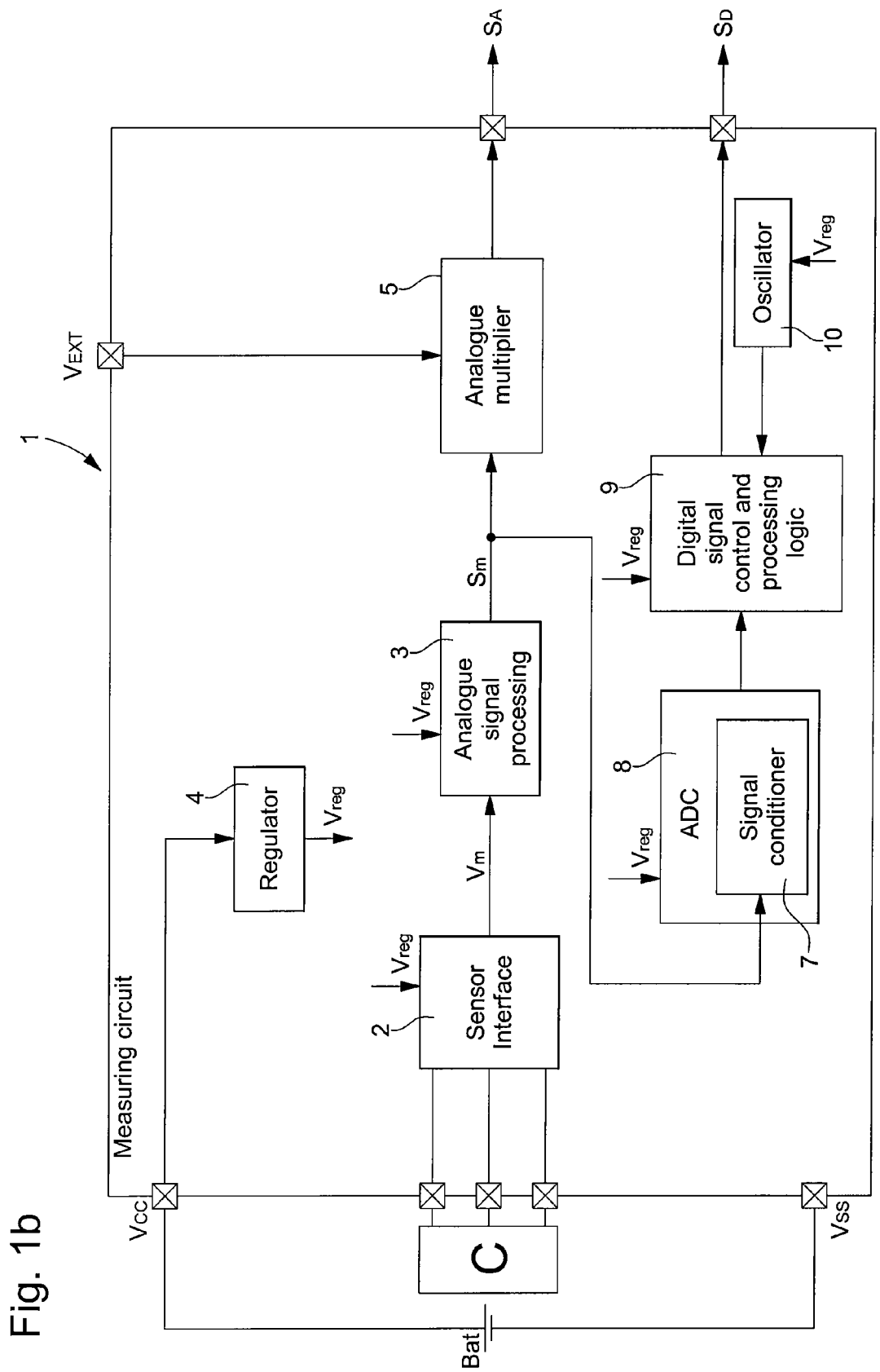

FIGS. 1a and 1b show two variants of a first embodiment of the electronic circuit 1 for measuring at least one physical parameter. The physical parameter measured may be, for example, an acceleration, angular velocity, force or pressure. This physical parameter can be measured using a sensor C, which may be a MEMS type sensor. The sensor is connected to the electronic measurement circuit 1 so that it can also be powered by said electronic circuit.

However, in the following description, reference will be made only to an electronic measurement circuit 1 connected, for example, to a MEMS type sensor C for measuring a physical parameter, which may be an acceleration, without thereby limiting the scope of protection. Of course, an electronic measurement circuit of this type, connected to other types of sensors for measuring other physical parameters, could be provided. Electronic measurement circuit 1 connected to sensor C could find application for example in the field of road vehicles, where electronic circuit 1 could be powered at terminals $V_{CC}$ and $V_{SS}$ by a continuous voltage source Bat, which may be a battery.

Electronic physical parameter measurement circuit 1 includes, first of all, a sensor interface 2. This sensor interface 2 is directly connected to sensor C so as to supply at output at least one analogue measurement signal $V_m$ representative of the physical parameter value, in particular the acceleration measured by sensor C.

The electronic circuit 1 further includes an analogue signal processing unit 3, an analogue-digital converter 8, a digital signal control and processing unit 9, an oscillator 10, a regulated voltage regulator 4, and a ratiometric unit, which is an analogue multiplier 5 in this first embodiment.

This analogue multiplier 5 may be powered directly or via a resistive bridge (not shown) by the external continuous voltage source Bat as shown in FIG. 1a. Analogue multiplier 5 may also be powered by a supply voltage supplied to a terminal $V_{EXT}$ by another continuous voltage source (not shown) as shown in FIG. 1b. In this manner, the multiplier can supply at output an analogue output measurement signal $S_A$ on the basis of the analogue measurement signal originating from sensor interface 2.

This output signal $S_A$ is representative of the acceleration value measured by sensor C and is also linearly dependent upon any variation in the level of the supply voltage applied to analogue multiplier 5. This output signal $S_A$ thus depends either upon the variation in voltage between $V_{CC}$ and $V_{SS}$ in accordance with the principle of ratiometry, as shown in FIG. 1a, or upon the variation in a supply voltage supplied to terminal $V_{EXT}$ as shown in FIG. 1b. This allows the electronic measurement circuit 1 to be directly connected to an electronic component or to a chain of electronic components, which are dependent upon any variation in the supply voltage $V_{CC}$ or $V_{EXT}$, such as analogue-digital converters.

Regulated voltage regulator 4 is connected directly or via a resistive bridge (not shown) to the external continuous voltage source Bat so as to generate a regulated voltage $V_{reg}$, which is preferably a low voltage. The value of the supply voltage of electronic measurement circuit 1 may be of the order of 5 V, whereas the regulated voltage $V_{reg}$ produced by the voltage regulator may be close to 1.8 V or 2 V.

Regulated voltage regulator 4 powers most of the electronic components of electronic circuit 1 with regulated voltage $V_{reg}$, with the exception of the ratiometric unit, which is analogue multiplier 5. Sensor interface 2, analogue signal processing unit 3, analogue-digital converter 8, digital signal control and processing unit 9 and oscillator 10 are all powered by this regulated voltage $V_{reg}$. Consequently, the analogue output signal $V_m$ produced by sensor interface 2 is independent of any variation in the level of supply voltage $V_{CC}$ of electronic circuit 1.

Sensor interface 2, analogue signal processing unit 3, analogue-digital converter 8, digital signal control and processing unit 9 and oscillator 10 can be integrated in a single integrated circuit made in low power CMOS technology less than μm, for example 0.5 μm, 0.18 μm or even lower. Moreover, since they operate for example at a regulated voltage of less than 2 V, the size of these elements can be reduced to a minimum. Multiplier 5, and voltage regulator 4 can also be made in the same integrated circuit while being powered, for example, directly by the external continuous voltage source Bat as shown in FIG. 1a, or by another continuous voltage source at terminal $V_{EXT}$ for multiplier 5, as shown in FIG. 1b.

MEMS type sensor C may be a capacitive sensor, which is formed of two differential mounted capacitors. A common electrode for the capacitors is able to move between two fixed electrodes via the action, for example, of a force, in order to alter the capacitive value of each capacitor. Sensor interface 2 is thus connected by three terminals directly to the capacitive sensor so as to supply at output at least one analogue measurement signal $V_m$ representative of the acceleration value measured by the sensor.

Sensor interface 2 may be made on the basis of an electronic interface such as that described for example in the article by Messrs. H. Leutold and F. Rudolph, which appeared in the review entitled "Sensors and actuators" A21-A23 (1990), pages 278 to 281. This sensor interface 2 generally includes a charge transfer amplifier unit, which is connected at input to the common electrode, an integrator unit for permanently supplying an analogue measurement signal at output. This analogue measurement signal is a voltage $V_m$ equal to the integral of the charges supplied by the amplifier unit. Sensor interface 2 also includes an excitation unit for cyclically polarizing the fixed electrodes, in a known manner and in polarization phases, at determined voltage levels, for example $V_{reg}$ and $V_{SS}$.

Sensor interface 2 may also be made on the basis of a dual structure. This dual structure is made up of two integrator units and two excitation units operating alternately in total symmetry. Because of this, voltage shift compensation mainly due to the technology used, can be reduced or even removed using two integrator output signals. When the electronic circuit is operating, each measurement cycle or period is thus divided into four phases, comprising two successive phases for each integrator.

This type of dual structure can thus provide twice as many analogue measurement signals each in the form of an output voltage. The mean of the two output voltages supplied by the two integrators can also improve the signal over noise ratio of the electronic circuit.

In the simplest case, sensor interface 2 thus supplies an analogue measurement signal $V_m$ to an analogue signal processing unit 3. This unit is essentially used for filtering the analogue measurement signal $V_m$ so as to supply a filtered measurement signal $S_m$. This filtering can be carried out by a single low-pass filter or by a first low-pass filter followed by a well known programmable second-order low-pass filter.

The filtered analogue measurement signal $S_m$ is directly supplied to analogue multiplier 5 to be multiplied by the value of supply voltage $V_{CC}$ or $V_{EXT}$, which is pondered by a predetermined constant factor K. Thus analogue multiplier 5 supplies an analogue output measurement signal $S_m$ which is linearly dependent upon any variation in the level of supply voltage $V_{CC}$ or $V_{EXT}$ to recreate the ratiometry on the analogue measurement signal.

Analogue multiplier 5 may include at output a programmable gain amplifier acting as a buffer memory for adapting the output impedance of electronic measurement circuit 1. This amplifier may receive a gain signal from a multiplier, which represents, for example, the natural logarithm of supply voltage $V_{CC}$ or $V_{EXT}$ pondered by a predetermined constant factor K, multiplied by the filtered analogue measurement signal $S_m$. As a function of the programmed gain, the amplifier supplies the analogue output signal based on the filtered analogue measurement signal $S_m$, multiplied by the programmed amplifier gain. With this arrangement in the electronic measurement circuit, it is possible to have a better power supply rejection ratio.

The filtered analogue measurement signal $S_m$ is also supplied to an ADC analogue-digital converter 8, whose input stage may include a conventional signal conditioner 7. This signal conditioner in the analogue-digital converter can adapt the level of the filtered analogue measurement signal to allow digital conversion.

Analogue-digital converter 8 supplies a digitised signal to a digital signal control and processing unit 9 on the basis of the analogue measurement signal $V_m$ from sensor interface 2. Control and processing unit 9 generates a digital measurement signal $S_D$, which is thus representative of the value of the acceleration, measured by capacitive sensor C. This digital measurement signal $S_D$ may also be supplied to an output terminal of electronic measurement circuit 1. Digital measurement signal $S_D$ is also totally independent of variations in the level of supply voltage $V_{CC}$ of electronic circuit 1, since all of the components used for producing this digital measurement signal are powered by regulated voltage $V_{reg}$ from voltage regulator 4.

All of the operations processed in control and processing unit 9 are clocked by a clock signal supplied by oscillator 10, which may be at a frequency of the order of 1 MHz. A series of dividers in control and processing unit 9 control, for example, sensor interface 2 to carry out the switch for each phase, for example at a frequency of the order of 100 kHz. Control and processing unit 9 may also include data storage means and control and configure the various electronic components of electronic circuit 1.

Figure 2A:
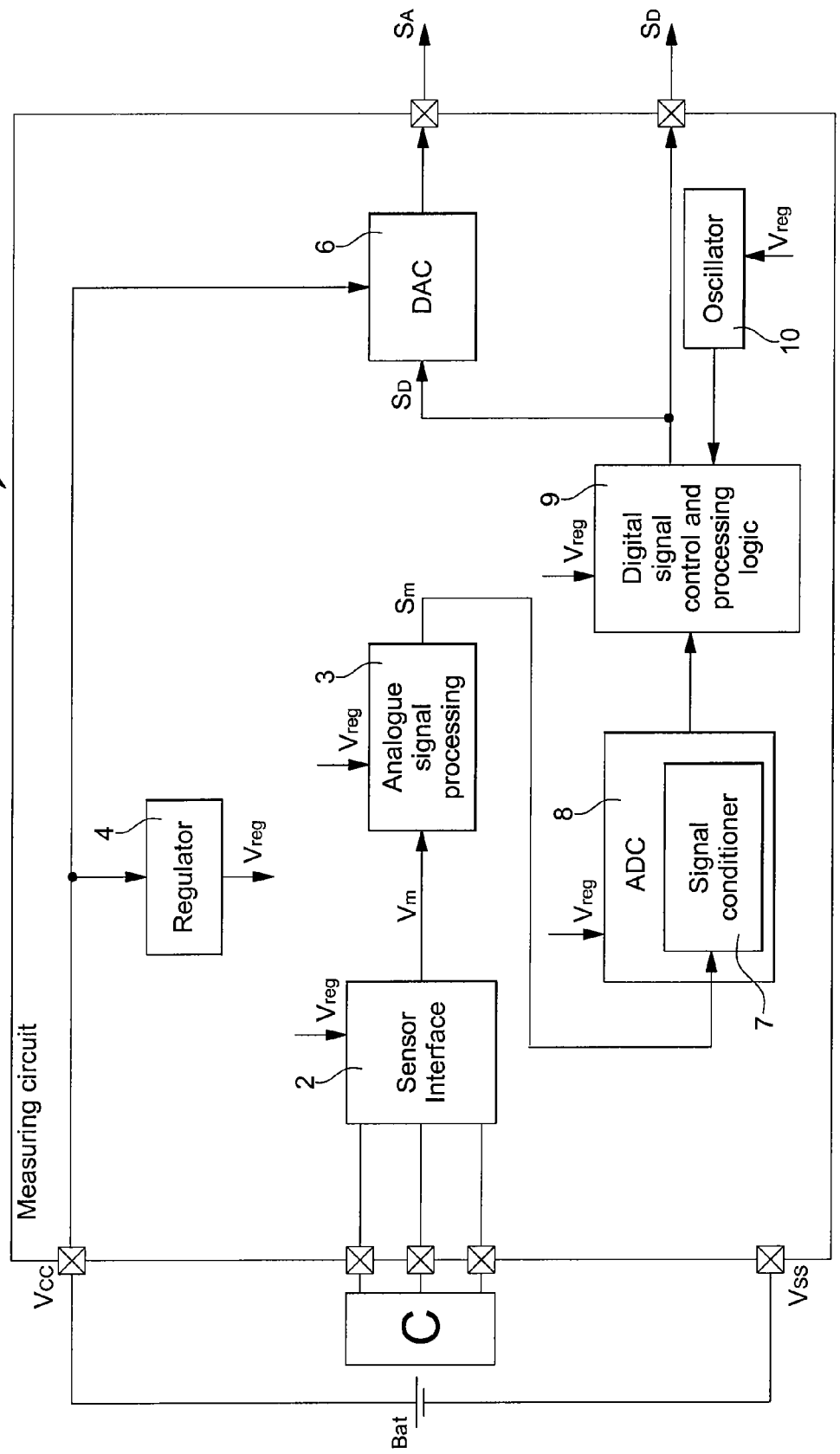

FIGS. 2a and 2b show two variants of a second embodiment of physical parameter measuring electronic circuit 1. As before with reference to FIGS. 1a and 1b, the physical parameter measured by sensor C is an acceleration. However, it is evident that the physical parameter measured could also be an angular velocity, force or pressure.

The two variants of this second embodiment of electronic circuit 1 differ from those of the first embodiment solely in that it is digital measurement signal $S_D$, which is used for generating the analogue output measurement signals $S_A$. Consequently, none of the other components of the electronic circuit, which bear the same reference signs as those described with reference to FIGS. 1a and 1b, will be explained.

The ratiometric unit for generating an analogue output measurement signal $S_A$ that can take account of variations in the level of the electronic circuit supply voltage $V_{CC}$ or any other supply voltage via a terminal $V_{EXT}$, is in this case a DAC digital-analogue converter 6. This DAC converter 6 can be connected directly or via a resistive bridge (not shown) to the terminals of continuous voltage source Bat, as shown in FIG. 2a. This DAC converter 6 can also be powered by a supply voltage supplied to a terminal $V_{EXT}$ by another continuous voltage source (not shown) as shown in FIG. 2b. The level of supply voltage $V_{CC}$ or $V_{EXT}$ can vary over time.

DAC converter 6 receives the digital measurement signal $S_D$ directly from control and processing unit 9 to supply at output the analogue output measurement signal, having easily recreated the ratiometry on said output signal. DAC converter 6 can be achieved, in a manner known in the state of the art, by a resistive divider connected, for example, between the two terminals of a supply voltage $V_{CC}$ or $V_{EXT}$ and $V_{SS}$, and an MOS transistor arrangement connected to each node between the resistors of the divider. These MOS transistors are controlled selectively across their gate by the digital signal in order to short-circuit some resistors of said divider and thus supply an analogue output signal dependent upon the supply voltage level.

Those skilled in the art can devise several variants of the electronic measurement circuit from the description that has just been given, without departing from the scope of the invention defined by the claims. One could use several analogue measurement signals produced by the sensor interface and then averaged, in order to recreate the ratiometry on the signal to be supplied at the output of the electronic circuit. The electronic circuit could include an analogue multiplier and a digital-analogue converter to supply two analogue output measurement signals dependent upon the supply voltage level.

What is claimed is:

1. An electronic circuit for measuring at least one physical parameter that is selected from the group consisting of acceleration, angular velocity, force and pressure, the electronic circuit including:
    a sensor interface, connected at its input to an external sensor that measures a physical parameter, and supplying at its output an analogue measurement signal which is a representative of a value of the physical parameter;
    an analogue-digital converter, digitally converting the analogue measurement signal;
    a digital signal control and processing unit, receiving in its input the resulting digitally converted signal, and supplying at its output a digital measurement signal which is a representative of the value of the physical parameter;
    a voltage regulator, powered via a first external supply voltage source, wherein the voltage regulator supplies a regulated voltage to the sensor interface, the analogue-digital converter and the digital signal control and processing unit, so that the analogue measurement signal and the digital measurement signal are independent of any variation in the level of the supply voltage from the first external supply voltage source; and
    a ratiometric unit, powered by a second external supply voltage source, wherein the ratiometric unit supplies an analogue output measurement signal which is a representative of the value of the physical parameter, wherein the analogue output measurement signal is obtained on the basis of the analogue measurement signal or the digital measurement signal that is independent of any variation in the level of the supply voltage from the first external supply voltage source, and wherein the analogue output measurement signal is dependent upon the variation in the level of the supply voltage from the first external voltage source or the second external voltage source.

2. The electronic circuit according to claim 1, wherein the ratiometric unit includes an analogue multiplier, multiplying the analogue measurement signal by a value of the supply voltage originating from the first external voltage source or the second external voltage source pondered by a predetermined constant factor, in order to supply an analogue output measurement signal dependent upon the variation in the level of the supply voltage of the analogue multiplier.

3. The electronic circuit according to claim 1, wherein the ratiometric unit includes a digital-analogue converter, powered via the first external supply voltage source or the second external supply voltage source, and receiving the digital measurement signal from the digital signal control and processing unit, in order to produce the analogue output measurement signal dependent upon the variation in the level of the supply voltage of the digital-analogue converter.

4. The electronic circuit according to claim 1, further including an analogue signal processing unit, arranged between the sensor interface and the analogue-digital converter, to shape the analogue measurement signal.

5. The electronic circuit according to claim 4, wherein the analogue signal processing unit includes at least one low pass filter, to supply a filtered analogue measurement signal.

6. The electronic circuit according to claim 4, wherein the analogue signal processing unit includes a first low pass filter directly connected to the sensor interface to filter the analogue measurement signal interface, and a second programmable second-order low-pass filter connected to an output of the first low pass filter to produce filtered analogue measurement signal.

7. The electronic circuit according to claim 5, wherein the filtered analogue measurement signal is supplied directly to an analogue multiplier of the ratiometric unit, to supply an analogue output measurement signal dependent upon the level of the supply voltage of the analogue multiplier.

8. The electronic circuit according to claim 1, further including an oscillator, connected to the digital signal control and processing unit, and clocking operations processed by the digital signal control and processing unit, wherein the digital signal control and processing unit supplying configuration data and controls operations of the electronic circuit components of the electronic circuit on the basis of a clock signal supplied by the oscillator.

* * * * *